United States Patent
Persson et al.

(10) Patent No.: US 8,151,730 B2
(45) Date of Patent: Apr. 10, 2012

(54) WASHING APPARATUS AND METHOD FOR CLEANING MILKING RELATED EQUIPMENT

(75) Inventors: Staffan Persson, Tumba (SE); Martin Sjolund, Grödinge (SE); Russell Kolstad, Waunakee, WI (US)

(73) Assignee: DeLaval Holding AB, Tumba (SE)

( * ) Notice: Subject to any disclaimer, the term of this patent is extended or adjusted under 35 U.S.C. 154(b) by 751 days.

(21) Appl. No.: 12/086,764

(22) PCT Filed: Dec. 19, 2006

(86) PCT No.: PCT/SE2006/001440
§ 371 (c)(1), (2), (4) Date: Dec. 11, 2008

(87) PCT Pub. No.: WO2007/073287
PCT Pub. Date: Jun. 28, 2007

(65) Prior Publication Data
US 2009/0194029 A1     Aug. 6, 2009

(51) Int. Cl.
*A01J 5/00* (2006.01)
*A01J 7/02* (2006.01)

(52) U.S. Cl. .................. 119/14.02; 119/14.18

(58) Field of Classification Search .......... 119/14.01, 119/14.02, 14.08, 14.14, 14.18; 134/166 C, 134/169 C
See application file for complete search history.

(56) References Cited

U.S. PATENT DOCUMENTS

| | | | |
|---|---|---|---|
| 3,278,961 A | 10/1966 | Svensson | |
| 4,061,504 A | 12/1977 | Zall et al. | |
| 4,530,370 A | 7/1985 | Horky | |
| 4,572,105 A * | 2/1986 | Chowdhury et al. | 119/14.18 |
| 5,405,452 A * | 4/1995 | Anderson et al. | 134/22.12 |
| 6,079,359 A | 6/2000 | Van den Berg | |
| 6,089,242 A * | 7/2000 | Buck | 134/57 R |
| 6,619,227 B1 * | 9/2003 | Berger et al. | 119/14.08 |
| 2003/0183249 A1 * | 10/2003 | Nissinen et al. | 134/22.11 |
| 2005/0037088 A1 | 2/2005 | Pendharkar et al. | |

FOREIGN PATENT DOCUMENTS

| | | |
|---|---|---|
| DE | 4429349 | 11/1995 |
| EP | 0603150 | 6/1994 |
| EP | 0772971 | 5/1997 |
| EP | 1177841 | 2/2002 |
| JP | 07-188306 | 7/1995 |
| WO | 99/39569 | 12/1999 |

OTHER PUBLICATIONS

Supplementary European Search Report for corresponding European Patent Application No. EP 06 83 5861 dated Sep. 13, 2010.

* cited by examiner

*Primary Examiner* — Rob Swiatek
*Assistant Examiner* — Ebony Evans
(74) *Attorney, Agent, or Firm* — Young & Thompson

(57) ABSTRACT

The invention is related to a washing apparatus for cleaning milking related equipment comprising a washing apparatus connectable to an automatic milking station (2) by interconnecting pipelines in such a way as to enable the washing apparatus to circulate a washing fluid through the milking related equipment of the automatic milking station (2). The washing apparatus (6, 7) comprise a circulation tank 6 and a separate pre-filling tank (7), whereby filling in advance and holding of the washing fluid to be used in a subsequent washing step is enabled. The washing apparatus (6, 7) further comprises connecting means for connection of the pre-filling tank (7) to the circulation tank (6). By means of the invention the time needed to complete a cleaning procedure is shortened essentially, and a cleaning procedure rendered more effective. The invention further relates to such method.

19 Claims, 4 Drawing Sheets

WASHING APPARATUS AND METHOD FOR CLEANING MILKING RELATED EQUIPMENT

FIELD OF THE INVENTION

The invention relates to a washing apparatus for cleaning milking related equipment of the kind defined in the preamble of claim 1 and to a method as defined in the preamble of claim 10.

BACKGROUND OF THE INVENTION

A hygienic handling of milk and prevention of bacterial content in the milk is important. One means to this end is a regular cleaning of milking related apparatuses, such as automatic milking stations comprising, among other things, teat cups, a receiver for intermediate storing of milk, one or more pumps and pipelines interconnecting the different parts. All these parts have to be cleansed several times a day in order to fulfil different requirements.

A typical state of the art washing cycle principally includes three steps: a first pre-rinsing step with lukewarm water, a subsequent main washing step utilising hot water including a washing liquid, and finally a rinsing step utilising cold water for eliminating remaining washing liquid. A washing apparatus is typically provided in connection with the milking station for performing such cleaning process, an example of which is disclosed in patent document U.S. Pat. No. 3,278,961.

The washing procedure is a rather time consuming necessity, and a pure loss of production time during which no production, i.e. milking, can be carried through. The washing process comprises several time consuming steps, such as for example, the switching of valves for connecting the milking station to a milking tank and to a washing apparatus, respectively, the warming up of water, the mixing of an appropriate amount of washing liquid, the several circulations needed to obtain the requested cleanness, certain adjusting time between the different steps and so on. Complicated mechanical solutions, for example solutions requiring four-way valves or other multipart devices, much tubing or replacement of parts, also consume a lot of time. Further, the more complicated construction the higher is the maintenance costs, and also the risk of stoppage of production due to failing parts.

The relatively long time needed for cleaning the milking related equipment is thus a shortcoming of the prior art washing apparatuses and methods, and any shortening of the time needed could entail a somehow corresponding increase in production time. It would thus be desirable to render the cleaning procedure more effective by speeding up the process, and it would also be desirable to be able to simplify the same.

SUMMARY OF THE INVENTION

An object of the present invention is to provide an improved washing apparatus and method for cleaning milking related equipment resulting in an essentially shortened cleaning time and thereby alleviating the shortcomings of the prior art.

A further object is to provide a solution that can easily be incorporated into existing cleaning equipment and procedures, enabling an improvement and time saving to be made by means of only a few adaptations. Further, such implementation should preferably be enabled at a low cost.

A yet further object is to facilitate the handling of washing chemicals and make such handling more secure, and also to render the cleaning procedure itself safer.

These objects, among others, are achieved by a washing apparatus as claimed in claim 1, and by a method as claimed in claim 10.

In accordance with the present invention a washing apparatus is provided for cleaning milking related equipment. The washing apparatus comprises a circulation tank connected to one or more automatic milking stations by interconnecting pipelines in such a way as to enable the washing apparatus to circulate washing fluids through milking related equipment. By further providing a separate pre-filling tank located external to the circulation tank and connected to it, it is possible to fill in advance and hold the washing fluids to be used in a subsequent washing step, while still executing a preceding step. A subsequent step is thus always prepared before a preceding step is finished, thereby highly increasing the efficiency of a cleaning procedure. The one or more milking stations can be utilised while a first washing step is being prepared. The time needed for preparing a washing step during which no production is possible is thereby eliminated and a great timesaving can be made.

In accordance with another embodiment of the invention the pre-filling tank is connectable to two or more interconnected automatic milking stations, whereby a cleaning of the milking related equipment of several automatic milking stations can be accomplished by use of a single pre-filling tank; that is, a single pre-filling tank is located in such a way as to enable a shared use of it by each of the automatic milking stations. The invention is thus easily adaptable to large-scale farms as well as small-sized farms, owing to the innovative layout of the system and simple and unitary connecting means between the pre-filling tank and circulation tank. A saving in equipment related costs is thereby realised, and the separate pre-filling tank is easily supervised, repaired and maintained.

In accordance with still another embodiment of the invention the pre-filling tank of the washing apparatus is connected to a tank containing washing chemicals. The washing chemicals to be used can thereby be stored centrally and away from the milking stations. A more secure and facilitated handling of chemicals is thereby achieved.

In accordance with yet another embodiment of the invention, the pre-filling tank of the washing apparatus is divided into to two sections, the sections being differently sized. A smaller section for use as a dosing part is located below a larger section for containing the water needed. The ratio of the cross section areas of the two sections is preferably approximately 1 to 100. This design makes an increase in the accuracy of the dosing possible, both regarding the accuracy over time as well as per usage. Further, by this feature it is possible to easily change the dosing during a washing process. Further yet, the use of a single level indicator is thereby enabled, thus both simplifying and improving the dosing.

The present invention also relates to such a method, whereby advantages corresponding to the above are obtained.

DETAILED DESCRIPTION OF PREFERRED EMBODIMENTS

The inventors of the present invention have located a bottleneck in the process for cleaning milking related equipment, and in particular automatic milking systems AMS. As is pinpointed by the inventors, in a state of the art washing cycle much time is consumed waiting for the washing apparatus to be filled with water or other washing fluids. Today, up to 10 minutes of a total washing duration of 25 minutes is spent waiting for the water to fill up the washing apparatus. The farmer could add animals to the herd and use this waiting time milking the additional animals instead. Further, most farms get their water from a local well, whereby the water most often has a low pressure and the time needed to fill the washing apparatus is further yet lengthened.

Figure 1:
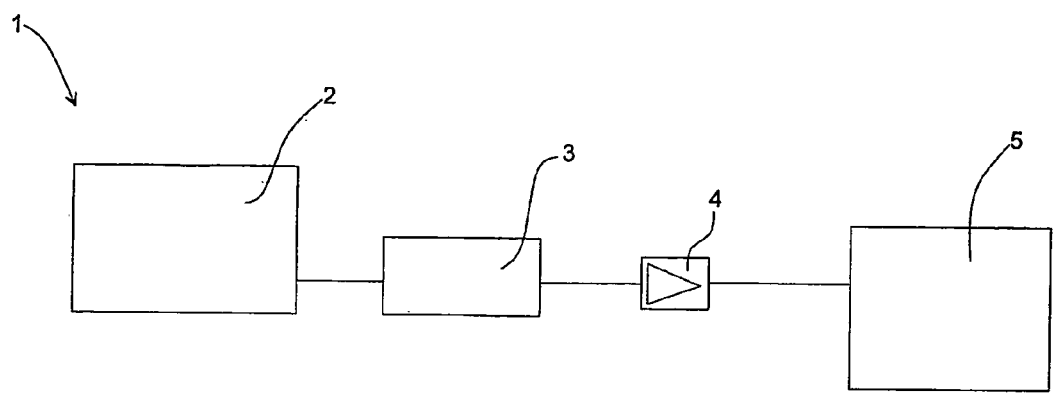
FIG. 1 schematically shows the layout of an automatic milking system.

FIG. 1 shows schematically an automatic milking system. An automatic milking system 1 usually comprises one or more automatic milking stations 2 including teat cups, robot arms, a vacuum source, milk meters, a receiver 3 for intermediate storing of milk provided in order to hinder that milk showing a deficient quality is sent further, as well as other milking related equipment. The automatic milking system 1 further comprises a pump 4 for dispatching milk to a milk tank 5, in which tank milk received during a number of milking occasions and/or from several milking stations 2 is stored. Further, pipelines interconnecting the different parts are also included. It is to be understood that such automatic milking system 1 may comprise a larger or smaller number of parts, and that certain parts may be omitted and other, not described parts may be present. The number of parts to be cleaned and included in the washing procedure is not essential for the invention, FIG. 1 only shows exemplary, usually included parts.

Figure 2:
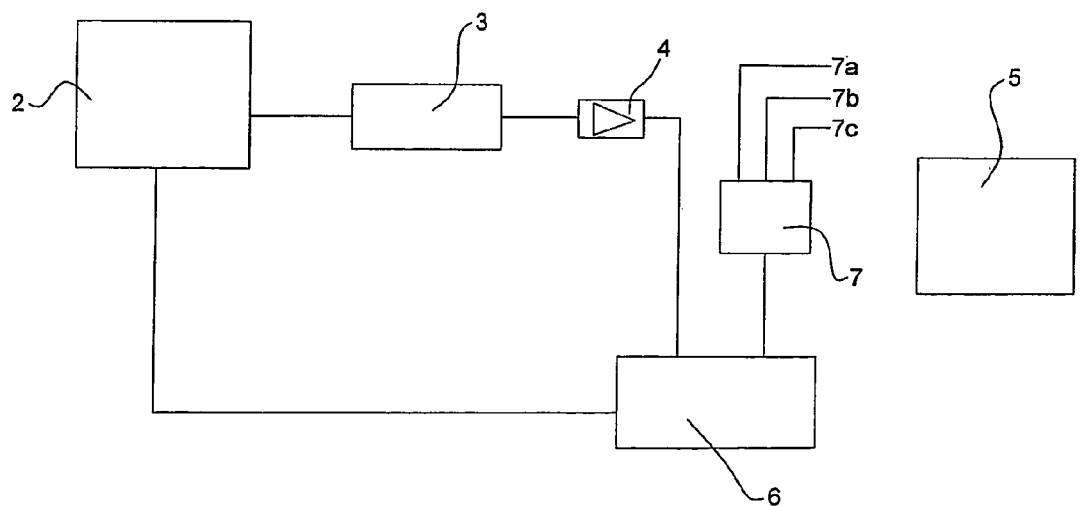
FIG. 2 schematically shows the layout of an embodiment of a washing apparatus for cleaning milking related equipment in accordance with the present invention.

FIG. 2 shows the washing apparatus for cleaning milking related equipment in accordance with the invention. The milking station 2 and the related parts have to be cleaned several times a day, and a washing apparatus is typically provided to this end. When the milking related equipment is to be cleaned, the milk tank 5 is disconnected and the milking related equipment is connected to the washing apparatus instead. The washing apparatus is further connected to another end of the automatic milking system 1, usually the teat cups, for enabling a circulation of the washing fluids through the system 1. In accordance with the invention the washing apparatus is divided into different parts: a separate tank or vessel, hereinafter called a pre-filling tank 7, and a tank 6 enabling the circulation of washing fluids, hereinafter circulation tank 6. The circulation tank 6 may in an embodiment simply comprise a reservoir, a temperature sensor and a level guard, and be connected to a pump or the like for enabling pumping the washing fluids through the equipment to be cleaned. The pre-filling tank 7 is connected to the circulation tank 6, and is preferably placed at a physically higher location than the circulation tank 6 in order to be able to quickly empty its contents into, it possibly even without the use of a pump. When designing such a washing apparatus, and more particularly when placing the pre-filling tank 7 in relation to the circulation tank 6, consideration should be taken such that the pre-filling tank 7 is preferably mounted at an easily accessible location enabling an easy mounting and dismounting. This makes it easy to enlarge a system by introducing additional milking stations to be cleaned should the need for such arise. That is, it is simple to connect an additional milking station to an already existing pre-filling tank, such addition possibly requiring the change to a larger pre-filling tank 7. Further, the change from using one pre-filling tank per milking station 2 to using a single pre-filling tank 7 for several milking stations 2 is facilitated.

In the pre-filling tank 7 the different washing fluids, usually water and washing chemicals, are prepared. The pre-filling tank 7 may comprise several inlets for this end, for example one for intake of hot water 7a, one for intake of cold water 7b and one for intake of washing liquid 7c. The preparation consists, for example, in heating the water to a desired temperature, if a hot water intake is not provided but only a cold water intake, mixing the appropriate amount of washing chemicals, and also choosing the correct kind of washing chemicals, for example whether it should be of acid or basic type. In accordance with the invention, all these different kinds of preparations can be made in a single tank, not necessitating a multitude of different tanks, thereby providing a most cost-efficient system.

In accordance with the invention, the pre-filling tank 7 supplying the water and/or other washing fluids to the circulation tank 6, is provided with suitable connection means to the circulation tank 6. Only a single pipe, flexible tubing, hose or the like is generally needed as the connection means, the pipe or the like being provided with a suitable valve. The connection means or interface is thus a very simple one, and whether the invention is implemented in a small-sized farm having only one milking station, or if it is implemented in a larger scaled farm having several milking stations but still only one pre-filling tank, the same connection means can still be utilised.

Further, the present invention may easily be implemented in existing automatic milking stations and existing washing apparatuses requiring only some minor modifications. The existing automatic milking station, and in particular the washing apparatus thereof, should be provided with an intake for connection to an external pre-filling tank, or an existing intake should be adjusted to fit to the innovative pre-filling tank 7. The costs for such modifications can be regained by the timesavings made, as was mentioned earlier.

The circulation tank 6 is usually a part of the automatic milking station 2. In accordance with the invention the same connection means in an automatic milking station 2 can be utilised irrespective of whether the pre-filling tank 7 is located external to the milking station 2, that is, shared by several milking stations 2, or if it is internal to the milking station 2, i.e. integrated with the milking station (but external to the circulation tank 6) and used only by this milking station.

Figure 3:
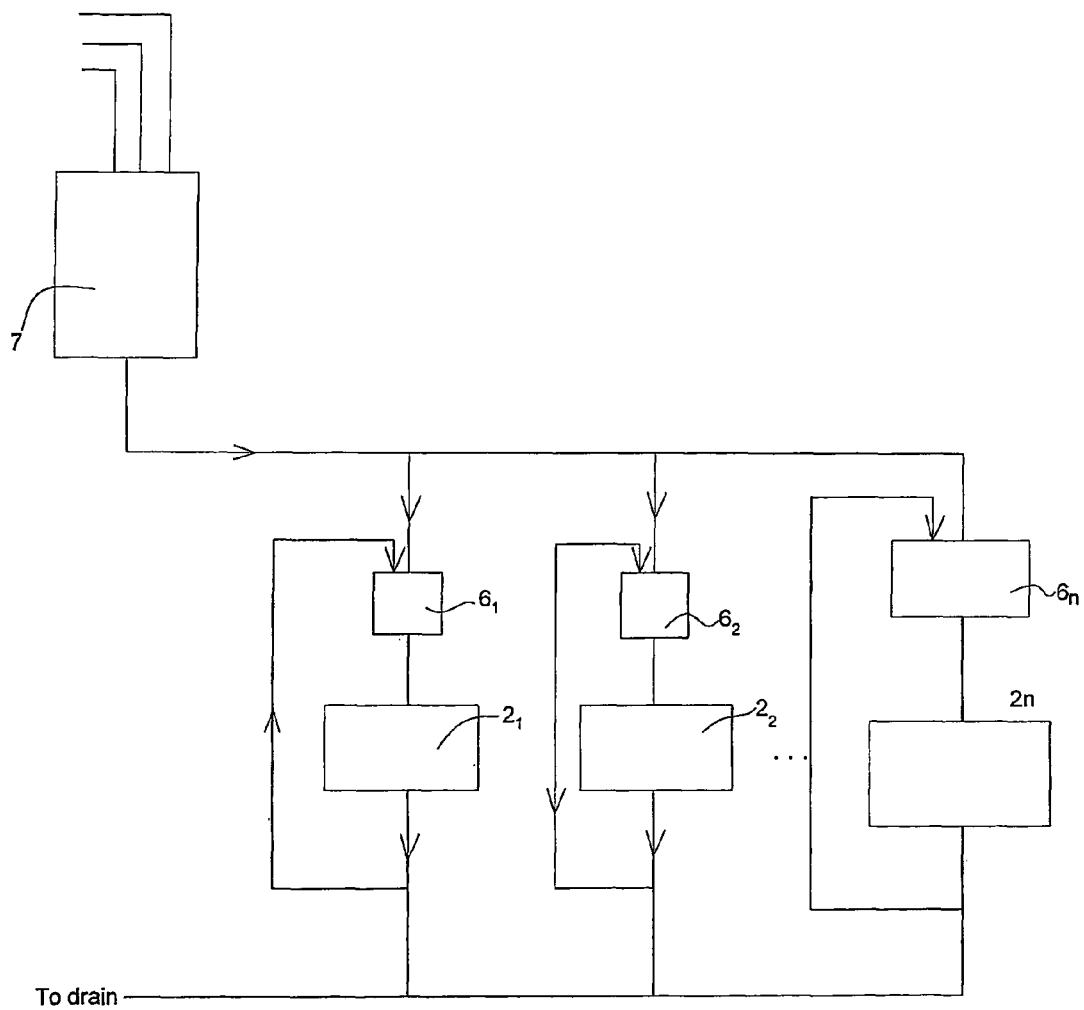
FIG. 3 schematically shows a layout of a second embodiment of a washing apparatus for cleaning milking related equipment in accordance with the present invention.

FIG. 3 shows an embodiment of the invention realised in a large-scaled milking farm having n milking stations $2_1$, $2_2$, ..., $2_n$. Each milking station $2_1$, $2_2$, ..., $2_n$ comprises a circulation tank $6_1$, $6_2$, ..., $6_n$ for circulating the washing fluids through each respective milking station $2_1$, $2_2$, ..., $2_n$. In this embodiment a single pre-filling tank 7 can be utilised for several milking stations $2_1$, $2_2$, ..., $2_n$. The preparation of a washing step, for example the mixing of washing chemicals in hot water, can be made centrally. The cleaning can be performed sequentially, i.e. one milking station at a time, or it can be performed simultaneously for all milking stations $2_1$, $2_2$, ..., $2_n$. When the washing procedure is finished, and after each washing step, the washing fluids are led to a drain. The location of a pre-filling tank 7 is preferably determined observing the aspects mentioned above regarding such placement. A single pre-filling tank 7 could be utilised, or two or a few pre-filling tanks 7 could be used, or even a pre-filling tank per milking station, thus providing a very flexible solution. If each milking station is provided with its own pre-filling tank, such tank should be of a more simple, low-cost design. If on the other hand a single pre-filling tank is used for many milking stations, it should be of a more robust kind, including for example supervising means, sensors, alarms etc.

The use of a centrally placed, single washing apparatus 6, 7 to be used by all automatic milking stations within a system is conceivable.

Washing chemicals can be placed centrally at a single location, preferably in close connection to the pre-filling tank 7, and away from the milking stations $2_1, 2_2, \ldots, 2_n$. This facilitates the handling of the chemicals, which are often provided in large packages usually weighing some twenty or thirty kilos, in that there is no need to replenish the chemicals at several different locations. Such central placement also reduces the risk of any chemical being inadvertently discharged in the vicinity of the milking stations, thereby rendering the handling safer.

Figure 4:
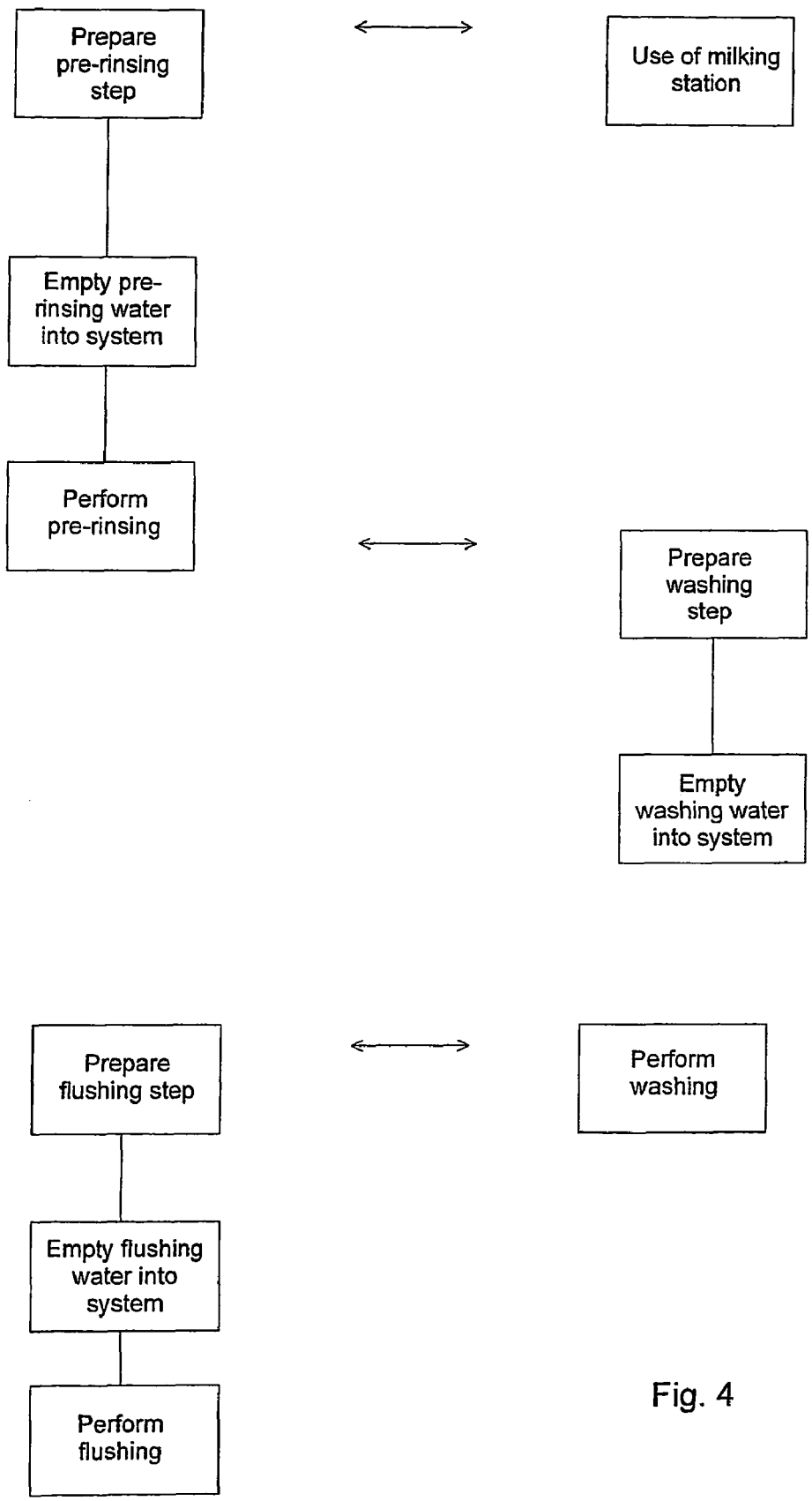
FIG. 4 shows a flow chart over an embodiment of a method for cleaning automatic milking stations in accordance with the present invention.

FIG. 4 shows a method for cleaning a milking station in accordance with the invention. In step 100 a first pre-rinsing step is prepared, while still utilising the milking station (step 90), i.e. while still milking an animal. The pre-filling tank 7 is filled with water of desired temperature, or alternatively filled with cold water that is heated to an appropriate temperature. Since this step is performed while still utilising the milking station 6 no time is wasted waiting for the filling of pre-rinsing water. Thus the fact that most milking plants have their own wells, which often means a low pressure and corresponding long filling time, has no influence on the cleaning time. The simultaneity of the preparation for the pre-rinsing step 100 and the ongoing use of the milking station is indicated in the figure by a double-headed arrow designated by the letter S, and in the following such double-headed arrows S are used for indicating the simultaneity of different steps. Thereafter, in step 110, the pre-rinsing water is emptied into the circulation tank 6 and subsequently circulated through the automatic milking station and its related milking equipment. While performing this pre-rinsing circulation, the preparation of the main washing step preferably utilising a washing liquid mixed in hot water, is effectuated in step 130. That is, the pre-filling tank 7 is now filled with a suitable mixture of hot water and a washing liquid. The addition of washing liquid is described more in detail later, and more particularly the determination of the appropriate amount thereof. When the pre-rinsing step is finished the prepared washing water is emptied into the circulation tank, step 140, after which the washing step is performed in step 150. While the washing is being effectuated, step 150, the preparation for an after-flushing stage is made in step 160. This preparation normally consists in filling the pre-filling tank with cold water, and as soon as the main washing step is finished the flushing water is emptied into the circulation tank 6, step 170. Thereafter the flushing is performed, step 180, after which the cleaning method ends. Alternatively, any of the steps described can be repeated if need be, i.e. one or more of the washing steps, whereby the same preparations are repeated while the previous step is being effectuated.

Thus, in accordance with the invention, a subsequent step is prepared before the preceding step is finished, whereby a considerable time saving can be made. The fluid or mixture needed for a step and entering the washing apparatus is thus always ready before a following step in the cleansing process is initiated. This is enabled by the use of a separate pre-filling tank 7. Further, the same pre-filling tank 7 can be utilised for the different steps, thereby reducing equipment related costs and eliminating the need for several tanks.

Today the washing liquid, or any other chemical to be used, is usually added to the washing water by means of a pump, whereby the measurement of the appropriate amount of washing liquid is performed by determining a pump time corresponding to the determined amount of washing liquid. Likewise, the dosing of water is performed by means of pressure control devices, whereby one empty pressure control device is needed for the dosing itself and another one is needed for measuring the water level in the container in question. The use of a pump for dosing the washing liquid has a disadvantage in that the amount of washing liquid added is not reliable over time, and this is compensated for by increasing the prescribed amount of washing liquid over time correspondingly. This entails both a cleanness concern as well as a possible waste of washing liquid. Another disadvantage is that the dosing of washing liquids is not accurate.

Figure 5A:
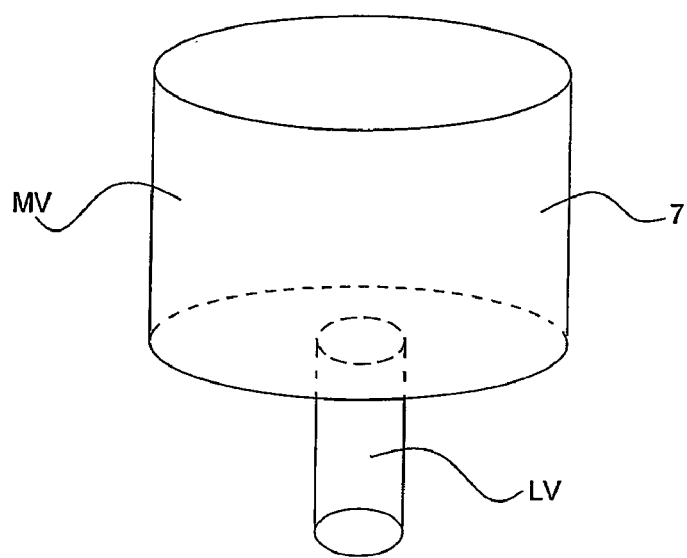
FIGS. 5a and 5b show different exemplary designs of a pre-filling tank in accordance with the invention.
Figure 5B:
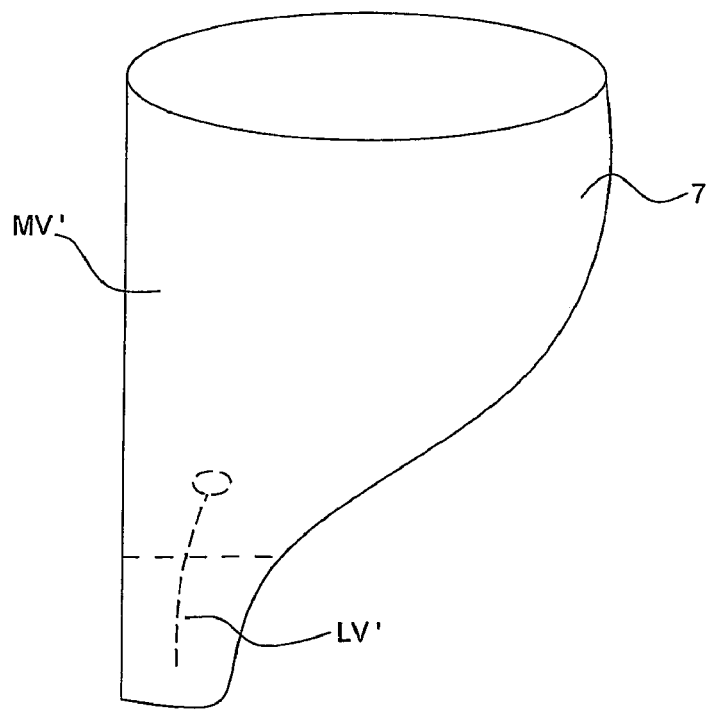

In an embodiment of the invention, the pre-filling tank 7 has an innovative shape, overcoming problems of the state of the art dosing of washing liquids. Two examples of such design are shown in FIGS. 5a and 5b, respectively. The design of the pre-filling tank is aimed at providing a smaller space or section in which the measuring of washing chemicals is made and a larger space or section in which the washing fluid can be stored.

In FIGS. 5a and 5b, respectively, two exemplary designs are shown. The pre-filling tank 7 comprises a body having two sections, a smaller lower section indicated by LV, LV' and a larger main section indicated by MV, MV', respectively. The cross section area relation between the differently sized sections could for example be 1 to 100. In the smaller section LV, LV' the dosing of liquid chemical is made, for example by using a level indicator, preferably being a sensor of floating type. The dosing of water is performed in the main section MV, MV' by using the same level indicator. The level indicator should compensate for the variation of cross section area in a way such that the height always corresponds to a volume with an accuracy of approximately 3%. By the provision of a smaller lower section an accurate dosing of chemicals is enabled. This innovative design also enables the use of different amounts of chemicals and different volumes of water in different steps of the cleaning process, and from time to time, which is not possible today without manually changing valves and settings before each such change of dosing. The different desired doses of washing fluid and washing chemicals, respectively, can conveniently be pre-programmed by means of the use of a level indicator in the innovative pre-filling tank design. Further, in accordance with the invention only a single level indicator, preferably of a floating type, is needed.

The above-described dosing system can of course also be used in other applications where chemicals are dosed.

Further advantages brought about by means of the present invention, and in particular owing to the fact that the pre-filling tank does not constitute an integrated part of the circulation tank, are that the pre-filling tank itself is conveniently cleaned if needed, the pre-filling tank is easily replaceable should such need arise, and the size of the pre-filling tank is easily adaptable in dependence on the size of the automatic milking system and/or other requirements of the automatic milking system.

The invention claimed is:

1. A washing apparatus for cleaning milking related equipment of an automatic milking station, the automatic milking station including i) a washing fluid inlet for receiving washing fluid to circulate through and clean the milking related equipment, and ii) a washing fluid outlet for discharging circulated washing fluid having circulated through the milking related equipment, said washing apparatus comprising:
- a circulation tank (6) having i) a discharge for discharging washing fluid, via an interconnecting pipeline, to the washing fluid inlet of the automatic milking station, and ii) an inlet for receiving circulated washing fluid, via another interconnecting pipeline, from the washing fluid outlet of the automatic milking station,
- wherein, in use during both of a first washing step and a second washing step, i) the circulation tank discharge is connected to the washing fluid inlet of the automatic milking station, and ii) the circulation tank inlet is connected to the washing fluid outlet of the automatic milking station, said circulation tank (6) discharging the washing fluid into the milking related equipment and then receiving the circulated washing fluid for repeated circulation of the washing fluid through the milking related equipment and through said circulation tank; and
- a pre-filling tank (7) having a discharge connected, via a further interconnecting pipeline, to an inlet side of said circulation tank (6),
- said pre-filling tank being external to and separated from said circulation tank,
- said pre-filling tank having a washing fluid capacity sufficient to hold, in advance, a volume of washing fluid necessary for the circulation tank performing either of the first and second washing steps,
- said pre-filling tank arranged to i) hold the washing fluid for the first washing step during the milking station milking an animal, and ii) discharge the washing fluid for the first washing step into the circulation tank for filling the circulation tank with the washing fluid prior to the first washing step,
- said pre-filling tank arranged to i) hold the washing fluid for the second washing step while the circulation tank circulates the washing fluid during the first washing step, and ii) discharge the washing fluid for the second washing step into the circulation tank for filling the circulation tank with the washing fluid prior to the second washing step,
- said circulation tank being fluid-disconnected from the milking station during the milking of the animal and transport of the milk from the animal.

2. The washing apparatus as claimed in claim 1, wherein said pre-filling tank is arranged for advance preparation of all washing steps performed by said washing apparatus.

3. The washing apparatus as claimed in claim 1, wherein said pre-filling tank is connectable to a respective circulation tank of two or more interconnected automatic milking stations in order to clean milking related equipment of said two or more automatic milking stations.

4. The washing apparatus as claimed in claim 3, wherein said pre-filling tank is connected to a tank containing washing chemicals, whereby said washing chemicals are stored remote from said two or more milking stations.

5. The washing apparatus as claimed in claim 1, wherein, said pre-filling tank has two differently sized sections, a smaller one of said sections is located below a larger one of said sections, in which smaller section dosing of chemicals is performed, and said larger section is arranged to contain the washing fluid.

6. The washing apparatus as claimed in claim 5, wherein the cross section area of said smaller section is smaller, about 100 times smaller, than said larger section, whereby an accurate dosing is accomplished.

7. The washing apparatus as claimed in claim 5, wherein said pre-filling tank comprises a heater for heating water of washing fluid.

8. The washing apparatus as claimed in claim 1, wherein said pre-filling tank comprises a single level indicator for determining a water level and for dosing of washing chemicals.

9. The washing apparatus as claimed in claim 1, wherein said pre-filling tank comprises one or more inlets for intake of at least one of water and washing liquid.

10. The washing apparatus as claimed in claim 1, wherein said pre-filling tank comprises a temperature sensor for obtaining an appropriate temperature for the washing fluid.

11. The washing apparatus as claimed in claim 1, wherein,
- said pre-filling tank is located physically higher than the circulation tank, and
- said circulation tank is gravity filled from said pre-filling tank.

12. The washing apparatus as claimed in claim 1, wherein said pre-filling tank is located physically higher than the circulation tank.

13. The washing apparatus as claimed in claim 1, wherein said pre-filling tank comprises a heater for heating water of washing fluid to a cleaning temperature.

14. A method for cleaning milking related equipment of at least one automatic milking station, said cleaning being performed by a washing apparatus operatively connectable to said at least one automatic milking station by interconnecting pipelines in such a way as to enable said washing apparatus to circulate washing fluids through the milking related equipment of said automatic milking station, said method comprising the steps of:
- performing one of i) a milking operation milking an animal, and ii) a first washing fluid-circulating cleaning step that includes repeatedly circulating washing fluids through a circulation tank into the milking related equipment for repeated circulation of the washing fluids through the milking related equipment and through said circulation tank;
- during said performing step, filling a pre-filling tank with washing fluids to be used in a subsequent washing step,
- said pre-filling tank having a washing fluids capacity sufficient to hold, in advance, a volume of washing fluids necessary for the circulation tank performing the subsequent washing step,
- the pre-filling tank being external to, separate from, and connected to the circulation tank via a further interconnecting pipeline,
- subsequent to said performing step, emptying the washing fluids from said pre-filling tank into said circulation tank; and
- executing said subsequent washing step including repeatedly circulating the washing fluids through the circulation tank into the milking related equipment for repeated circulation of the washing fluid through the milking related equipment and through said circulation tank.

15. The method as claimed in claim 14, wherein said performing step is executed while still using said at least one automatic milking station for milking of an animal.

16. The method as claimed in claim 14, wherein said washing steps comprise pre-rinsing, main washing, and after flushing, said pre-filling tank holding the washing fluids for said main washing step during said pre-rinsing step.

17. The method as claimed in claim 14, wherein the washing fluids in said pre-filling tank is used for cleaning milking related equipment of two or more interconnected automatic milking stations.

18. The washing apparatus as claimed in claim 17, wherein the washing fluids capacity of said pre-filling tank is greater than a fluid capacity of the circulation tank.

19. A washing apparatus for cleaning milking related equipment of an automatic milking station, said washing apparatus comprising:
- a circulation tank configured for fluid connection to an automatic milking station during a cleaning thereof and fluid disconnection from the milking station during milking of an animal and transport of the milk from the animal, the automatic milking station including i) a washing fluid inlet for receiving washing fluid to circulate through and clean the milking related equipment, and ii) a washing fluid outlet for discharging circulated washing fluid having circulated through the milking related equipment,
- the circulation tank having i) a discharge for discharging washing fluid, via an interconnecting pipeline, to the washing fluid inlet of the automatic milking station, and ii) an inlet for receiving circulated washing fluid, via another interconnecting pipeline, from the washing fluid outlet of the automatic milking station, wherein, in use during a washing step, i) the circulation tank discharge is connected to the washing fluid inlet of the automatic milking station, and ii) the circulation tank inlet is connected to the washing fluid outlet of the automatic milking station, said circulation tank (6) discharging the washing fluid into the milking related equipment and then receiving the circulated washing fluid for repeated circulation of the washing fluid through the milking related equipment and through said circulation tank; and a pre-filling tank (7) having a discharge connected, via a further interconnecting pipeline, to an inlet side of said circulation tank, said pre-filling tank being external to and separated from said circulation tank, said pre-filling tank having a washing fluid capacity sufficient to hold, in advance, the washing fluid of the circulation tank necessary for the washing step, said pre-filling tank arranged to i) in advance of the washing step with the circulation tank in fluid disconnection with the milking station, hold the washing fluid for the washing step, and ii) discharge the washing fluid for the first washing step into the circulation tank for filling the circulation tank with the washing fluid prior to the first washing step.

\* \* \* \* \*